United States Patent [19]

Schmidt

[11] Patent Number: 5,341,182

[45] Date of Patent: Aug. 23, 1994

[54] MOTION PICTURE PROJECTION APPARATUS

[75] Inventor: Leland R. Schmidt, Simi Valley, Calif.

[73] Assignees: Pioneer Technology Corporation; L. Ron Schmidt and Associates, Inc., both of Burbank, Calif.

[21] Appl. No.: 4,511

[22] Filed: Jan. 14, 1993

[51] Int. Cl.[5] .......................... G03B 1/00; G03B 1/52
[52] U.S. Cl. .................................... 352/184; 352/222
[58] Field of Search ............... 352/184, 185, 222, 159; 226/87

[56] References Cited

U.S. PATENT DOCUMENTS

| | | | |
|---|---|---|---|
| 1,299,469 | 4/1919 | Holmes | 226/87 |
| 2,747,457 | 5/1956 | Wengel | 352/184 |
| 3,007,368 | 11/1961 | Rosenblum | 352/184 |
| 3,065,890 | 11/1962 | Fox | 352/159 |
| 3,135,159 | 6/1964 | Fabregat et al. | 352/184 |
| 3,214,233 | 10/1965 | Persidsky | 352/184 |
| 3,236,580 | 2/1966 | Zahn | 352/184 |
| 3,397,827 | 8/1968 | Heisler | 352/184 |
| 3,512,693 | 5/1970 | Utsumi | 226/87 |
| 3,600,073 | 8/1971 | Shaw | 352/184 |
| 4,009,949 | 3/1977 | Nupnau | 352/159 |
| 4,039,256 | 8/1977 | Teeple, Jr. et al. | 352/184 |
| 4,114,996 | 9/1978 | Shaw | 352/184 |
| 4,206,981 | 6/1980 | Ozaki et al. | 352/14 |
| 4,420,231 | 12/1983 | Gottschalk | 352/142 |
| 4,441,796 | 4/1984 | Shaw | 352/184 |
| 4,477,160 | 10/1984 | Trumbull | 352/40 |
| 4,560,260 | 12/1985 | Trumbull | 352/40 |
| 4,697,896 | 10/1987 | Fox | 352/180 |

OTHER PUBLICATIONS

Two photographs of a motion picture projector Data sheet for the Pacer-35 motion picture projector "American Cinematographer" article dated Oct., 1980.

Primary Examiner—Michael L. Gellner
Assistant Examiner—Eddie C. Lee
Attorney, Agent, or Firm—Lyon & Lyon

[57] ABSTRACT

A motion picture apparatus for the projection of motion picture film which advances the film through the projection sequence by forced air. The film is initially placed into successive looped configurations formed by a cam-driven flipper. The loops and thus the film are advanced through the projector pathway by a forced air blower which propels the loop through a projection pathway. Vacuum pressure is also applied to the film through a gate to secure the film to a gate with linearly arranged register pins steadying the film over a projection aperture. The film is rewound through the projector by a motorized rewind with a positive pressure applied to the film through the gate.

12 Claims, 4 Drawing Sheets

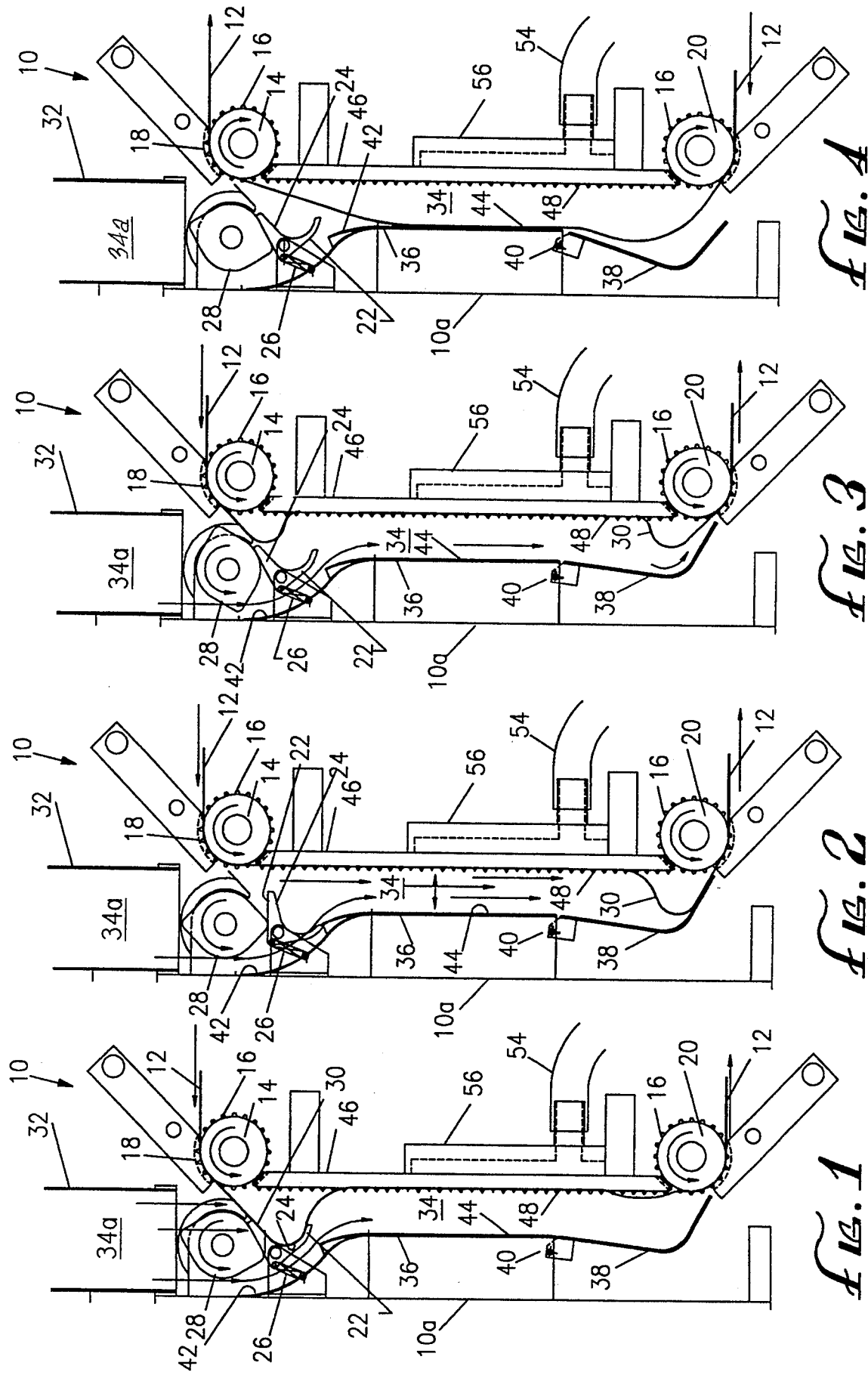

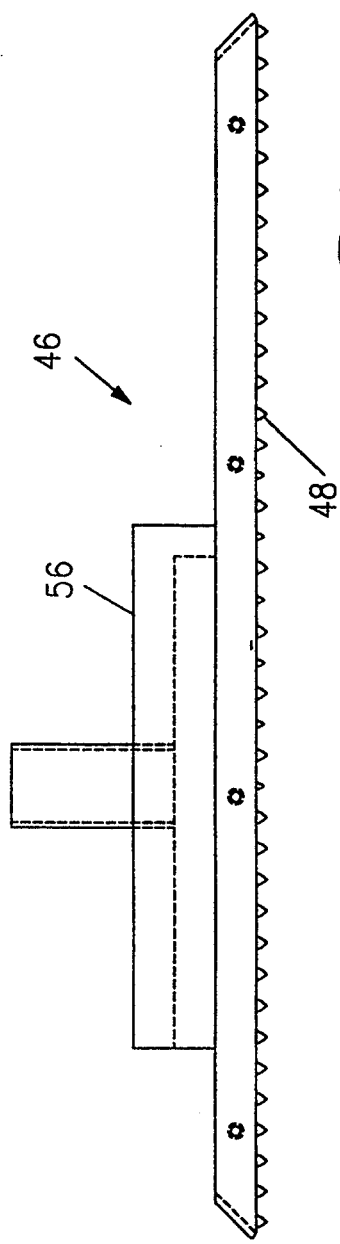
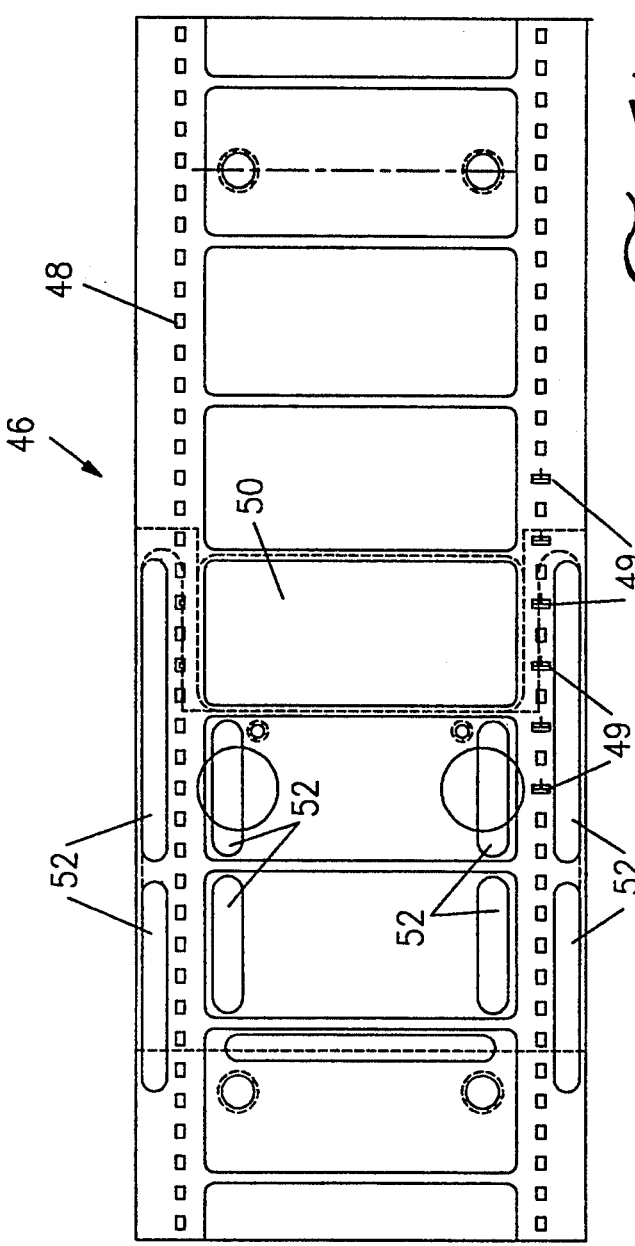
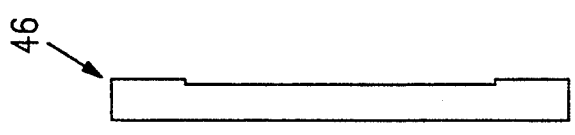

MOTION PICTURE PROJECTION APPARATUS

The present invention relates to motion picture projection systems. Motion picture projectors have been utilized in a variety of situations in addition to their familiar use in movie theaters. Thrill rides at theme parks utilize motion picture projectors to simulate surroundings and enhance the true to life look and feel of a particular ride. Planetarium projectors are used to project realistic images onto a large, domed projection screen.

These conventional projectors have numerous mechanical and electrical components to control film speed, film placement and the particularly difficult task of rewinding the film. Accordingly, the conventional projectors often develop operational problems requiring frequent maintenance and repair work. This idles the particular projector and may even shut down the theater or thrill ride. Conventional motion picture projectors may also employ computer actuated controls, requiring additional operator skills to maintain and repair.

The present invention eliminates the numerous mechanical and electrical components by using a directed flow of air to propel film through a projector. The present invention is compact, easy to use and has the added advantage of cooling the film during operation of the projector. Film rewind is also easily accomplished.

In a feature of the present invention, the motion picture film enters the projector housing by an input sprocket having sprocket teeth which mesh with perforated openings along a length of the film. A similar output sprocket takes up the film at the outlet side. The invention utilizes a flipper having a crescent shaped surface to place a series of loops into the motion picture film. The flipper has been biased by a spring so that this surface on the flipper mates with the film. A cam contacts the flipper to cause the flipper to move repeatedly up and down to sequentially advance the loops toward a projection pathway. As the film is advanced, the sequential barrage of loops are propelled by the air flow from a multi-stage air blower along the film's path. Once again, mechanical parts are kept to a minimum.

An air foil may form one side of the film's projection pathway. A rotatable guide member is secured to the lower end of the air foil by a hinge so the guide member can pivot about the air foil and direct the loop to facilitate film supply or film rewind. The air foil is comprised of first curved surfaces and second planar surfaces that span from near the air blower to the outlet.

Positioned opposite the air foil is the gate which, in this embodiment, spans between the input sprocket and the output sprocket. Two rows of register pins are arranged in pairs along the gate in a substantially linear fashion to engage the paired perforated openings on the film and secure the film over a projection aperture. A feature includes a few register pins with a wider transverse dimension to reduce unwanted sideways motion of the film. A vacuum is applied to secure the film to the gate during advancement while positive pressure is applied to the film during the rewinding operation to keep the film off the gate and speed up the rewind process.

Another feature utilizes a single multi-speed motor which is coupled to the various moving parts by different couplers, including the shutter, the cam and the film input and take-up drivers allowing synchronized operation of the projector. An encoder may also be used to accurately control film speed and film positioning. Because of the relatively small number of parts, the present invention is easier to operate and maintain requiring no extensive computer software nor other expensive parts to service.

Accordingly, it is an object of the present invention to provide a motion picture apparatus, but other and more detailed objects and advantages will appear to those skilled in the art from the following description and the accompanying drawings, wherein:

FIG. 1 is a side cut-away view of the present invention illustrating the direction of movement of the film with arrows indicating the respective rotational directions of the cam and sprockets.

FIG. 2 is a side cut-away view taken later in time compared to FIG. 1 illustrating the direction of the loop and air flow (with arrows) through the motion picture projector.

FIG. 3 is also a side cut-away view of the present invention showing the sequential movement of the loop in the film from its position in FIG. 2 and showing (with arrows) the flow of air.

FIG. 4 is another side cut-away view illustrating the motion picture apparatus rewinding the film with arrows showing the rotational direction of the sprockets.

FIG. 5a is a top view of the gate that temporarily secures or registers the film between the film input and the film output.

FIG. 5b is a side elevation view of the gate

FIG. 5c is an elevation view from another side of the gate.

Figure 6:
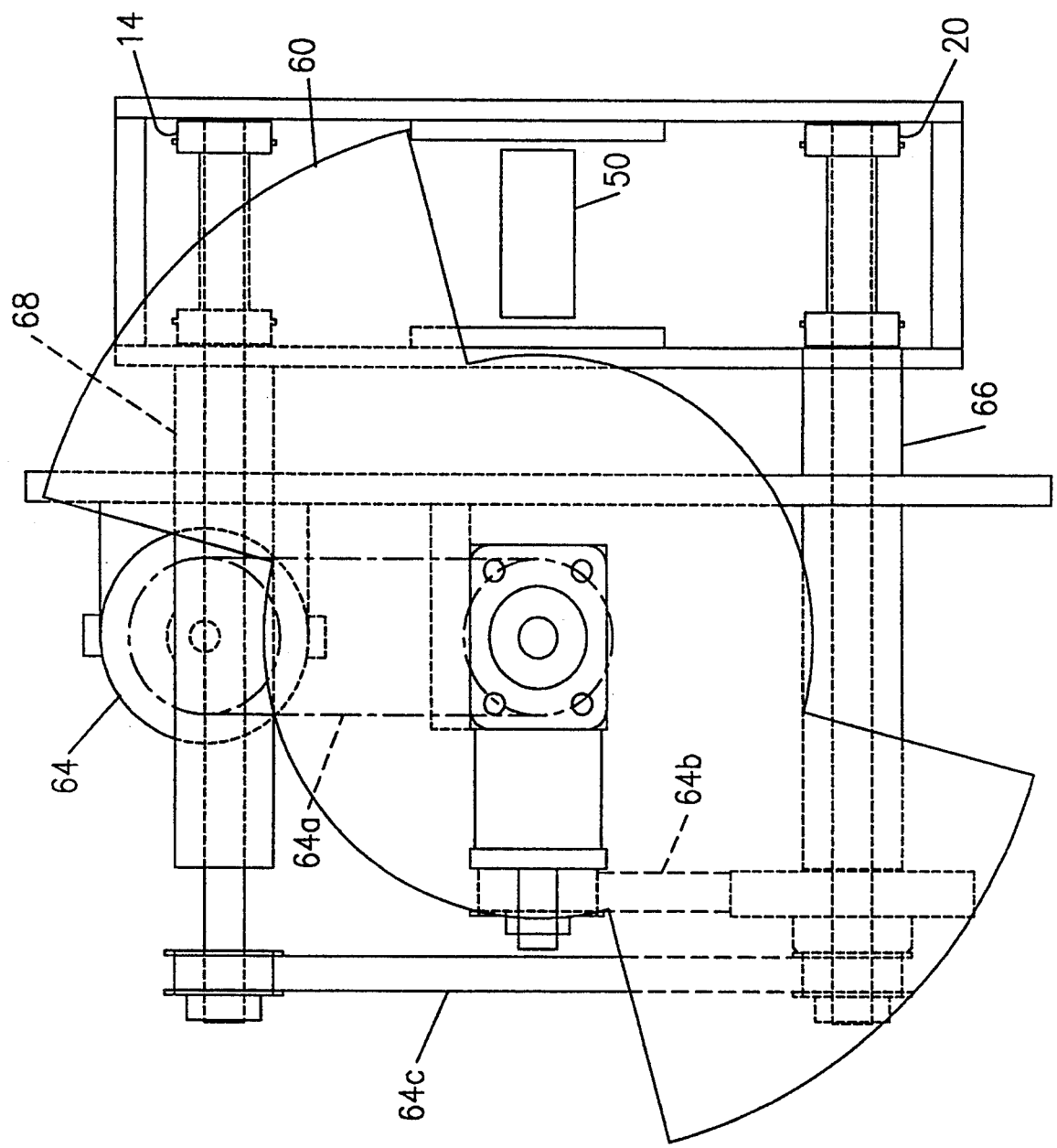
FIG. 6 is a rear elevation view of one embodiment of the present invention illustrating the position of the shutter, a multi-speed motor and the coupling of the motor to the shutter and the input and output sprockets.

Referring now to the figures, FIG. 1 illustrates the motion picture apparatus 10 and a portion of the support housing 10a. As shown in FIG. 1, the motion picture film 12 enters the housing 10a by a cylindrical input sprocket 14. Sprocket teeth 16 on the sprocket 14 mesh with perforated openings 18 paired at regular intervals along the length of the film 14. At another end of the housing 10a, the film 12 is taken up by a cylindrical output sprocket 20 also having sprocket teeth 16 on the circumference of the sprocket 20.

The film 12 next engages the flipper 22 which, in this embodiment, has a crescent shaped surface 24 feature to engage the film 12. A spring 26 biases the flipper 22 so that the surface 24 contacts the film 12 after the film 12 enters the housing 10a. As shown in FIG. 1, a cam 28 is positioned directly above the flipper 22. As the cam 28 is rotated, its surfaces strike the flipper 22 to actuate up and down movement of the flipper 22 as shown later in sequence in FIGS. 2 and 3. The flipper 22 thereby places a loop 30 in the film 12 as illustrated in FIG. 1. A multi-stage air blower 32, shown schematically in FIGS. 1–4, is placed above the cam 28 to force air downward past the cam 28 and the flipper 22 through duct 34a. In one feature, the air blower 32 may be a Rotron blower model no. SL2P2 which is adjusted to input an air pressure equivalent to approximately fifteen inches of water. As the film 12 is advanced, a series of loops 30 (and thus the film 12) is propelled along a first pathway 34 by air pressure from the blower 32 as shown in FIGS. 2 and 3 illustrating the sequential movement of a loop 30.

Spanning from just adjacent to the blower 32 past the flipper 22 is the air foil 36 which forms one side of the first pathway 34. A guide member 38 is secured to the lower end of the air foil 36 by a hinge 40 so the guide member 38 can pivot about the air foil 36 to facilitate the film supply operation or a film rewind operation. The guide member 38 may be "L" shaped as shown in FIGS. 1-4 or may be substantially straight. The air foil 36 is comprised of first curved surfaces 42 starting below the blower 32, the cam 28 and the flipper 22 and is comprised of second planar surfaces 44 along a span of the first pathway 34.

Positioned opposite the air foil 36 is the gate 46 which, in this embodiment, spans between the input sprocket 14 and the output sprocket 20 as shown in FIGS. 1-4. FIG. 5a shows the gate 46 has substantially planar surfaces where it mates with the film 12. Two rows of register pins 48 are arranged in a linear fashion along the gate 46 so that pairs of register pins 48 engage the paired perforated openings 18 on the film 12 and securing the film 12 over the projection aperture 50. As shown in FIG. 5a, some register pins 48 have a wider transverse dimension 49 to reduce unwanted sideways motion of the film 12 that causes unwanted flutter of the projected picture.

A plurality of ports 52 are arranged on the gate 46 so that a pressure may be applied to the film 12 through a pressure input line 54 connected to a Rotron blower model no. RDC12HF which supplies the pressure. A jacket 56 surrounds the ports 52 and distributes the pressure to the ports 52. This pressure may be changed from a vacuum pressure to a positive pressure through a switching valve 58, shown schematically in FIG. 7. A vacuum pressure equivalent to ten inches of water has been found to be sufficient to secure the film 12 to the gate 46.

During film advancement, the loops 30 span between the air foil 36 and the gate 46 with a portion of the film 12 over the aperture 50 so that the flow of air from the blower 32 propels the loop 30, in effect forcing the loop 30, through the first pathway 34. Using 70 millimeter film with five perforation advance, a distance of approximately 13/16 of an inch between planar surfaces 44 and the gate 46 is used. The film speed or frame rate can be adjusted to accomodate frame rates of 24, 30, 48 or 60 frames per second.

During film advancement, vacuum pressure is supplied through the ports 52 and the gate 46 to hold a portion of the film 12 to the gate 46. As shown in FIG. 4, the film 12 may be rewound through the apparatus 10. During rewind, the air blower 32 is turned off and the film 12 is transported between the output sprocket 20 and the input sprocket 14 through the first pathway 34 as the sprockets 14 and 20 are driven in the rotational direction illustrated (by arrows) in FIG. 4. A positive pressure may be supplied to the first pathway 34 through the ports 52 and the gate 46 to keep the film 12 off of the gate 46 during the rewinding process.

Figure 7:
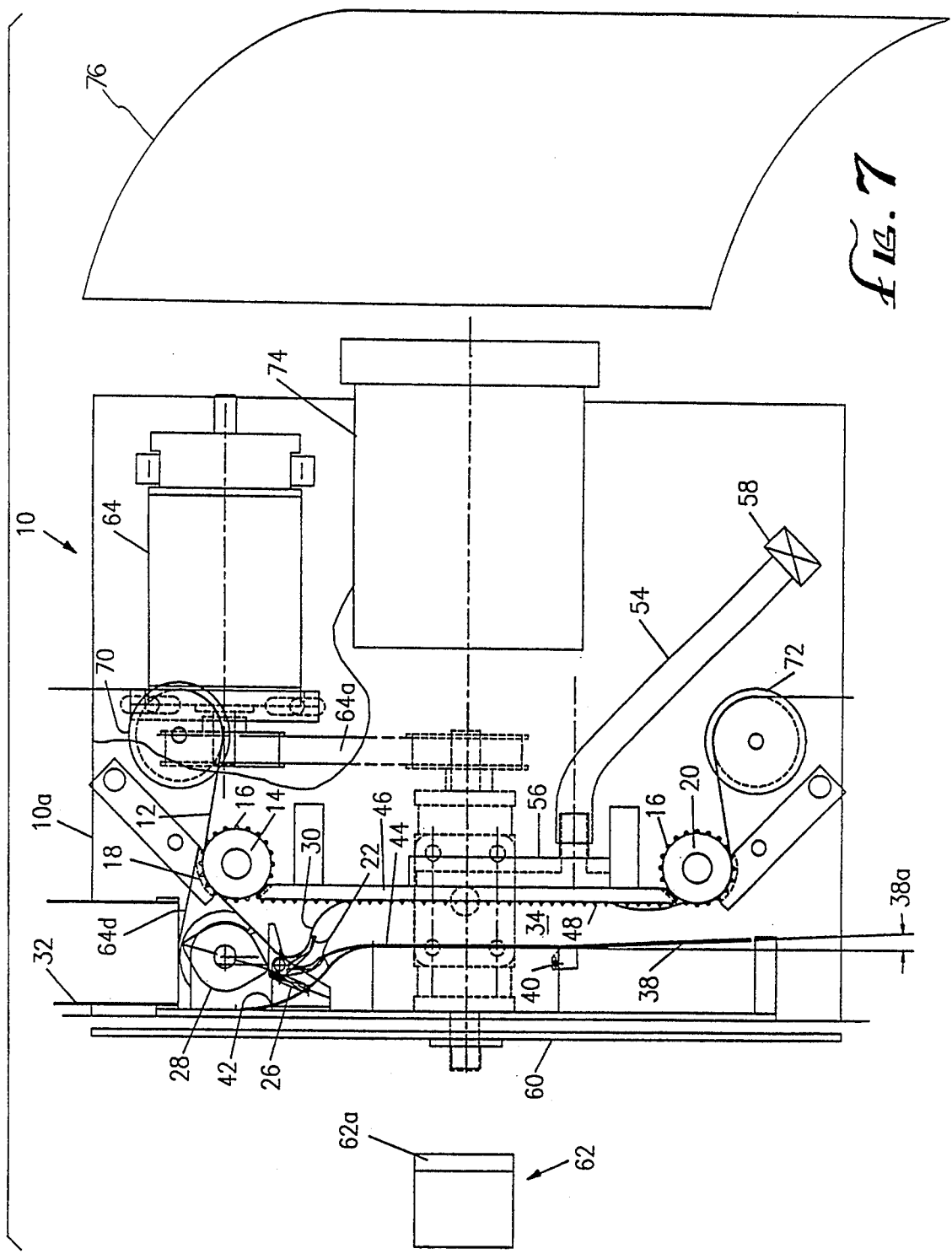
FIG. 7 is another side view of the present invention showing two positions of the flipper and illustrating the projection lens, a cut-away view of the motor and schematically illustrating the light source.

The guide member 38 may be pivoted toward the gate 34 or pivoted away from the gate 34 as required for film advancement or film rewind. As shown in FIG. 7, a rotated angle 38a of the guide means 38 of between zero degrees and ten degrees is used to provide a path for advancement of the film 12 toward the output sprocket 20.

Another feature is shown in FIG. 6, where the multi-speed motor 64 is illustrated with various couplers 64a, 64b and 64c. One feature uses a Torque Systems DC motor model no. MT 3630-131AF and may include an encoder to accurately control the operation speed of the apparatus 10. The motor 64 is coupled to the shutter 60 by a first coupler 64a to provide intermittent illumination of the film 12. A second coupler 64b couples the motor 64 to an output driver 66 to transport film 12 from the output sprocket 20. A third coupler 64c couples the output driver 66 to the input driver 68 to transport film 12 from the input sprocket 14. The output driver 66 and the input driver 68 may each employ a clutch mechanism to allow smooth film 12 advancement or rewind.

Referring again to FIG. 7, a fourth coupler 64d is shown coupled to the cam 28 which allows the motor 64 to also propel the cam 28. The light source 62 and first lens 62a, which initially focuses the light onto the film 12, are shown schematically. The input spooler 70 and the output spooler 72, coupled to the film 12, are shown adjacent to the input and output sprockets 14 and 20 respectively for transporting film into or away from the sprockets 14 and 20. The projection lens 74 which projects the illuminated motion picture onto a screen 76 is shown in its preferred location on the housing 10a.

While the preferred embodiment of the present invention and modifications thereto have been shown and disclosed in the drawings and specification, alternate embodiments of the present invention may be apparent to a person of ordinary skill in the art and this application is intended to include those embodiments within the full breadth and scope of the claims. The present invention is not limited by any parameters described herein and the present invention need not include all of the features disclosed in the single embodiment but rather one or more features may be included.

What is claimed is:

1. A motion picture projection apparatus comprising:
   film input means and film takeup means for motion picture film;
   gate means spanning between said film input means and said film takeup means comprising film engagement means to mate with said film, said gate means comprising a projection aperture;
   control means for selectively supplying a positive pressure or a vacuum pressure through said gate means to said film depending upon whether said film is being advanced or said film is being rewound;
   air foil means positioned opposite said gate means for advancing or rewinding said film, said air foil comprising a guide member integrally connected to said air foil means by a pivot means;
   air input means for directing air flow toward said film takeup means between said gate means and said air foil; and
   a biased flipper, contacted by a cam which causes said flipper to engage said film and place successive portions of said film in loops spanning between said air foil means and said gate means so that each of said loops is propelled toward said film takeup means by said air flow.

2. The apparatus of claim 1 where said film engagement means comprises a plurality of paired linearly arranged register pins on said gate means, said gate means further comprising a plurality of ports for supplying forced air pressure to said film.

3. The apparatus of claim 1 where said air foil means comprises first curved surfaces and second planar surface.

4. The apparatus of claim 1 where said control means further comprises a switching valve to selectively supply a forced air pressure or a vacuum pressure to said gate means.

5. The apparatus of claim 1 where said flipper comprises a crescent shaped surface to mate with said film.

6. The apparatus of claim 1 where said guide member is rotated about said pivot means to direct said loops toward said film take up means.

7. The apparatus of claim 1 further comprising a light source, a shutter for intermittent illumination of said film, first lens that directs light from the light source through said film and through said projection aperture onto a projection lens which focuses the light onto a screen.

8. The apparatus of claim 1 further comprising film drive means for advancing or rewinding said film at a predetermined speed.

9. The apparatus of claim 8 where said film drive means comprises a multi-speed motor.

10. The apparatus of claim 1 wherein said air input means is a multi-stage blower.

11. A motion picture projection apparatus comprising:
   a housing having an inlet and an outlet;
   film input means and film takeup means for transporting motion picture film between said inlet and said outlet;
   a first pathway between said inlet and said outlet, said first pathway comprising a projection aperture;
   control means for selectively supplying a positive pressure or a vacuum pressure to said film;
   air input means for directing air flow through said first pathway toward said outlet;
   film looping means, secured adjacent to said film input means and biased to engage said film so as to place successive loops in said film which span said first pathway past the projection aperture; and
   a gate means and an air foil positioned opposite said gate means, said gate means comprising a plurality of ports and a plurality of paired linearly arranged register pins for positioning said film adjacent to said projection aperture, said air foil comprising a guide member integrally secured to said air foil by a pivot means.

12. A motion picture projection apparatus comprising:
   a housing having an inlet and an outlet;
   film input means and film takeup means for transporting motion picture film between said inlet and said outlet;
   a first pathway between said inlet and said outlet, said first pathway comprising a projection aperture;
   control means for selectively supplying a positive pressure or a vacuum pressure to said film;
   air input means for directing air flow through said first pathway toward said outlet;
   film looping means, secured adjacent to said film input means and biased to engage said film so as to place successive loops in said film which span said first pathway past the projection aperture; and
   a gate means and an air foil positioned opposite said gate means, said gate means comprising a plurality of ports and a plurality of paired linearly arranged register pins for positioning said film adjacent to said projection aperture, said air foil comprising a guide member integrally secured to said air foil by a pivot means, wherein said guide member is selectively rotated about said pivot means to facilitate the rewinding of said film or to direct said loop toward said film takeup means.

* * * * *